United States Patent
Bautner

(10) Patent No.: US 6,405,481 B1
(45) Date of Patent: Jun. 18, 2002

(54) QUICK RELEASE PLANT HOLDER

(76) Inventor: Robert Bautner, 4141 S. 900 East, Holladay, UT (US) 84124

( * ) Notice: Subject to any disclaimer, the term of this patent is extended or adjusted under 35 U.S.C. 154(b) by 0 days.

(21) Appl. No.: 09/574,988

(22) Filed: May 19, 2000

(51) Int. Cl.$^7$ .............................. A01G 9/10; A01G 9/02
(52) U.S. Cl. ............................... 47/77; 47/66.5; 47/65.8
(58) Field of Search .................................. 47/73, 77, 74, 47/66.3, 66.4, 66.5, 84, 86, 65.8; 220/23.91, 507, 23.2, 23.4, 23.6, 23.8, 531, 676; 206/423, 561, 562, 564

(56) References Cited

U.S. PATENT DOCUMENTS

| | | | | |
|---|---|---|---|---|
| 2,242,149 A | * | 5/1941 | Shelley | 47/86 |
| 3,009,291 A | * | 11/1961 | Blackmore | 47/87 |
| 3,014,614 A | * | 12/1961 | Carroll | 220/660 |
| 3,651,976 A | * | 3/1972 | Chadbourne | 220/23.4 |
| 3,949,868 A | | 4/1976 | Allen | |
| 4,118,890 A | | 10/1978 | Shore | |
| 4,118,892 A | | 10/1978 | Nakamura et al. | |
| 4,144,672 A | | 3/1979 | Gradwell et al. | |
| 4,197,674 A | | 4/1980 | Blackmore, Jr. | |
| 4,242,834 A | | 1/1981 | Olsen | |
| 4,333,267 A | | 6/1982 | Witte | |
| 4,389,814 A | | 6/1983 | Andreason et al. | |
| 4,413,725 A | | 11/1983 | Bruno et al. | |
| 4,753,037 A | | 6/1988 | Whitcomb | |
| 4,769,946 A | | 9/1988 | de Groot et al. | |
| 4,854,075 A | | 8/1989 | Greiling | |
| 4,926,587 A | | 5/1990 | van Wingerden | |
| 4,970,824 A | | 11/1990 | Visser | |
| 5,035,105 A | | 7/1991 | Qvarnström | |
| 5,131,185 A | | 7/1992 | Wingerden | |
| 5,152,100 A | | 10/1992 | Weder et al. | |
| 5,155,935 A | * | 10/1992 | Tanimura et al. | 47/86 |
| 5,274,953 A | | 1/1994 | Nicholson | |
| 5,315,785 A | * | 5/1994 | Avot et al. | 47/72 |
| 5,315,786 A | * | 5/1994 | Smith et al. | 47/74 |
| 5,419,080 A | | 5/1995 | Buss et al. | |
| 5,496,251 A | | 3/1996 | Cheng | |
| 5,515,644 A | * | 5/1996 | Weder et al. | 47/41.12 |
| 5,581,936 A | | 12/1996 | Belgiorno | |
| 5,609,901 A | | 3/1997 | Geddes et al. | |
| 5,678,356 A | | 10/1997 | Van Wingerden | |
| 6,088,962 A | * | 7/2000 | Johnson | 47/73 |
| 6,195,938 B1 | * | 3/2001 | Kay | 47/77 |

FOREIGN PATENT DOCUMENTS

| | | | | |
|---|---|---|---|---|
| FR | 2312944 | * | 12/1976 | 47/73 F |
| FR | 2491033 | * | 4/1982 | 47/73 F |
| GB | 945729 | * | 1/1964 | 47/73 F |

* cited by examiner

Primary Examiner—Peter M. Poon
Assistant Examiner—Son T. Nguyen
(74) Attorney, Agent, or Firm—TraskBritt, PC

(57) ABSTRACT

A method and apparatus for transplanting a seedling and/or plant from a container that substantially reduces damage to the seedling and/or plant. The container includes at least one upstanding side wall and an outwardly extending flange at an upper portion thereof. The upper portion includes slots therein which define a tab therebetween. A stress riser proximate an end of the slot is formed when the tab is manually forced downward, resulting in a portion of the side wall stripping away to expose the contents of the container. The contents of the container can thereby be easily and quickly removed without substantially damaging the seedling and/or the plant therein.

30 Claims, 5 Drawing Sheets

QUICK RELEASE PLANT HOLDER

BACKGROUND OF THE INVENTION

1. Field of the Invention

The present invention relates to holders or containers for retaining and transporting plants. More specifically, the present invention relates to plant holders or containers constructed for facilitating the removal of the plant therefrom prior to the generally permanent placement of the plant in soil.

2. State of the Art

It is common procedure in commercial greenhouses and large scale reforestation and farming operations to initially germinate and/or grow new plants in a controlled environment. Such environments increase the likelihood of the new plant's survival during the first few months of the plant's life. The new plants are typically maintained in the controlled environment until they reach a predetermined stage of development. Upon reaching this stage of development, the new plants are transported to a selected location where they are placed in the soil to continue their growth on a long term basis.

Growing new plants in a controlled environment spatially removed from their intended long term growing situs requires the plant grower to provide a temporary container for the new plant during its maturation in the greenhouse. Conventionally, new plants are grown in small plastic containers. These containers are oftentimes arranged in arrays or matrixes and are known by designations such as pony packs, trays, flats, etc. Not only do these containers provide a means of retaining the new plant and its growing medium during the initial growth stages of the plant, but furthermore, these containers provide a means for transporting the new plant to its eventual long term planting situs.

As the new plant develops, its root structure becomes enmeshed in the growth medium which surrounds it in its container. Disruption of that association of the root structure and its associated growth medium can prove damaging to the plant and its long term survivability. In those instances wherein the container is manufactured of a nonbiodegradable material, the plant root structure must be removed from the container in order to plant the new plant in the soil of its long term growth situs. Given the importance of maintaining the root structure in close association with the growth medium surrounding it in the container, it becomes important that the user be able to remove the root structure from the container with a minimum disruption of the root structure's association with its growth medium. Traditionally, users have encountered significant difficulties in safely removing the root structure from its respective container. In many instances, the user would grasp the plant by its stem and attempt to pull the plant root structure from the container. In the event that the growth medium or the root structure was securely lodged in the container, e.g. the growth medium being dry and fairly hard, the root structure would resist removal from the container. It is found from experience that when the growth medium surrounding the root structure of each seedling grows to an extent so as to fill the capacity of its container, it becomes difficult to dislodge the seedling from the pack or pot. In particular, the roots of the plant may become lodged and root-bound to the inside surface of the pack or pot, and therefore, the roots are liable to tearing and damage during removal from the packs or pots. In the aforedescribed circumstances, as the user applied more force to the plant stem to secure the plant's removal from the container, he or she would oftentimes break the stem of the plant thereby destroying the plant.

In those instances wherein the growth medium was very wet, grasping the stem and pulling on it would often result in the root structure being disassociated from its growth medium. This dissociation prejudices the chances of the plant surviving once it is planted in the soil. In other situations, the user would compress the container prior to extracting the plant root structure from the container with the expectation that the compression would ease the removal of the root structure from the container. In these instances, the compression resulted in damage to the root structure. It follows that considerable damage and loss of plants have occurred due to the lack of available means of safely removing the root structure and accompaning growth medium from its initial growth container.

Accordingly, it is expedient to devise an arrangement for dislodging a plant root and its associated growth medium from various sized containers without damaging the plant, and further, to remove the plant in an efficient manner.

As such, it is important to ensure that the container arrangement offers sufficient facility and convenience to dislodge each plant together with its roots and growth medium in such a manner that detrimental separation of the growth medium from the roots does not occur at the time of transplantation. It is essential, especially in transplanting projects, to ensure that the survival chances of replanted plants are high, and root separation from the growth medium during transplanting is certain to be avoided.

Various efforts have been made in the past to provide containers for developing plants. Illustrative of these efforts are the following:

U.S. Pat. No. 3,667,159 teaches a unitary seedling "flat" made of rigid plastic and containing a plurality of cells in the form of square downwardly tapering recesses. The seedling flat of this reference has no special facilities for releasing the seedlings together with their root balls. In the '159 patent, the seedlings have to be apparently pulled out of the cells, offering no special advantages for safe and easy removal of the seedling root balls, and especially, if the roots are lodged and root bound to the inside of the cells.

U.S. Pat. No. 3,889,416 to Bergeron et al. teaches a seedling arrangement for reforestation purposes, containing a plurality of tubes adapted to be supported vertically in a tray. The tubes are intended for elevated growing, but contain no special provision or convenience for easily dislodging the seedling without damage and separation being inflicted on the root ball. In fact the vertically extending ribs, provided on the inner cylindrical surface of the tubes in the '416 patent, tend to make the tubes rigid and stiff by reinforcing, whereby the tubes will not easily flex. As such, the rigid tubes necessitates rolling, pinching, or pulling action on the rigid container in order to release the seedling, making it very difficult to safely release the seedling together with the root ball and growth medium without damaging the seedling. In many cases, it may be necessary to tip the container upside down in an effort to remove the plant, resulting in root and/or plant damage.

In an effort to prevent damaging the root system while transplanting seedlings, U.S. Pat. No. 4,197,674 to Blackmore, Jr. discloses a plant container with a plurality of downwardly extending compartments each made for containing the root ball and system of a seedling. The bottom end of the compartment is constructed of thin material and is slitted to form yieldable flap members that can bend and reverse inwardly so that an ejection plunger can move upwardly therethrough to thereby eject the contents of the compartment. However, the use of an additional piece to complete this task, such as an ejection plunger, is cumbersome, inefficient, and such a device may easily be lost or misplaced. Further, depending on the consistency of the soil, damage may easily still occur to the root system of a seedling by forcing the ejection plunger through the bottom of each compartment to dislodge the contents thereof.

Based on the foregoing, it would be advantageous to provide an apparatus and an associated method that would at once provide a functional container for young plant development while simultaneously providing a means for easily removing the plant's root structure and associated growth medium from the container at the time of transplantation. Such a new container would also provide a means of minimizing the likelihood of the root structure being damaged or dissociated from its growth medium.

BRIEF SUMMARY OF THE INVENTION

The present invention provides an apparatus for retaining a developing plant in association with its growth medium. The apparatus if adapted with structure for facilitating the removal of the plant root structure and its associated growth medium while minimizing damage to the plant and any disassociation of the plant root structure from its growth medium. The apparatus includes a container structure having at least one upstanding side wall. The side wall is configured to have a portion thereof which is adapted to be readily stripped away from its general association with the sidewall by means of the user applying a small manual force to the sidewall portion, e.g. by means of his or her fingers. In preferred constructions, the sidewall portion includes at least one slot defined within the sidewall. The slot extends from a free edge of the sidewall into the body of the side wall. The slot functions as a stress riser sufficient that upon the application of a modest amount of force to the sidewall proximate the slot, the sidewall may be made to rupture along a length, e.g. a height, thereof causing the sidewall to open up and thereby permit the user to safely remove the plant root structure and growth medium without the need of compressing the root structure and growth medium or applying inordinate force to the plant stem.

In some embodiments of the invention the container may include an outwardly extending flange in association with the upstanding sidewall, preferably disposed on an upper portion of the sidewall. In these embodiments the slot or slots may extend from a free edge of the flange into the body of the flange. In some instances, the slot may extend through the flange and into the body of the sidewall itself.

In the present invention, the stress riser slot results in a strip-away side wall so that the soil surrounding the root structure of a plant remains intact and undamaged during the removal process thereby enabling the user to quickly and productively transplant a new plant from the container, resulting in an increased survival rate for the plant. A method for removing the plant from the container is also disclosed.

BRIEF DESCRIPTION OF THE SEVERAL VIEWS OF THE DRAWINGS

The method and apparatus of the present invention will be more fully understood from the detailed description of the invention taken in conjunction with the drawings, wherein.

DETAILED DESCRIPTION OF THE INVENTION

Figure 2:
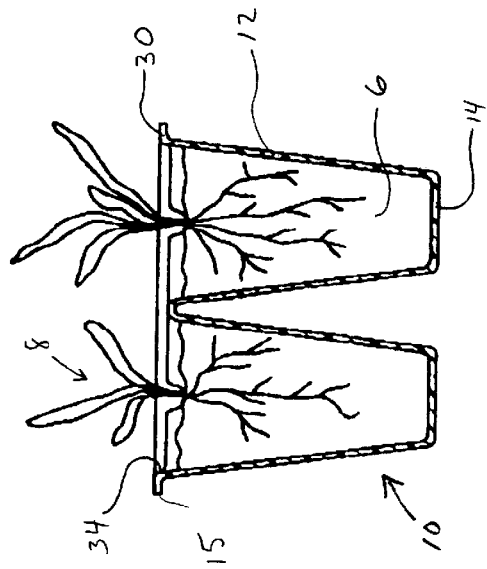
FIG. 2 is a cross-sectional side view of the plant container tray of FIG. 1, illustrating slots in the side walls of each container.
Figure 1:
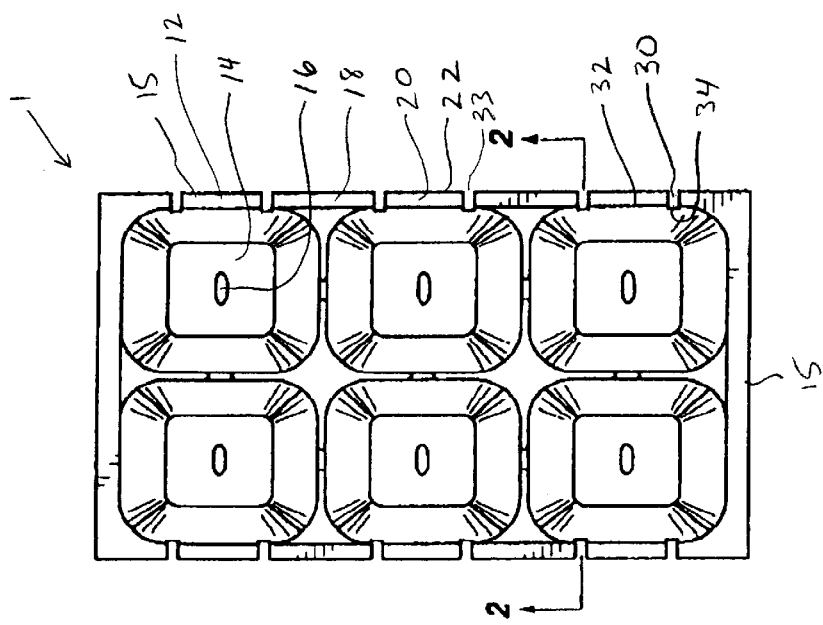
FIG. 1 is a top plan view of a plant container tray, illustrating a plurality of containers, in accordance with the present invention.

Referring to drawing FIG. 1, a top view of a plant tray 1 is shown having six cell containers 10, in a matrix arrangement of two cells in one direction and three cells in another direction (2×3). While the tray shown in FIG. 1 is illustrative it should be understood that the instant invention may be applied to single containers as well as trays having any number of associated containers. Furthermore, the invention may also find application to trays having various matrix arrangements. The tray 1 may contain and may have a means for facilitating the separation of the individual cell containers 10 from each other, such as perforations therebetween (not shown). Each cell container 10 is particularly suited for germinating and/or growing plants during their initial stages of development. FIG. 2 illustrates a cross-sectional side view of FIG. 1, depicting an exemplary seedling in each of the cell containers 10.

The tray 1 is preferably made from, but not limited to, a thin plastic, such as polystyrene, polypropylene, or polyethylene. The polystyrene is generally less durable than polypropylene and polyethylene. The thin plastic typically comes in the form of a roll having a thickness of approximately 0.020 inches to 0.024 inches thick. To form the tray 1, the thin plastic may be unrolled over a mold and heated in a process known as thermal forming. The finished container product may include, but is not limited to, a wall thickness of approximately 0.005 inches to 0.010 inches thick. The present invention is not limited to thermal forming, but rather, the present invention may be employed in any process known to one of ordinary skill in the art suited to producing a container structure having a container sidewall thickness of between approximately 0.005 inches to 0.010 inches in thickness.

As shown each cell container 10 may include one or more sidewalls 12 which extend upwardly from a bottom floor 14. Each sidewall 12 is secured to the bottom floor 14 and to adjacent sidewalls along its two opposing upstanding edges thereby forming an open topped container structure. Each container structure is typically formed by four side walls 12 terminating at the bottom floor 14. Further, in some constructions the sidewalls 12 and the bottom floor 14 may all be formed from a single integral sheet of material. In an alternative construction, the container 10 may be formed of a single side wall 12 and bottom wall 14 to thereby have the shape of a cylindrical cone. Furthermore, the bottom wall 14, or the lower surface as it may be (i.e., cylindrical cone cell), may define a hole 16 for allowing air circulation and water drainage from the soil 6 and seedling 8 in the cell container 10. In some embodiments of the invention the container 10, may include a plurality of holes and/or vents in the side walls 12 and bottom wall 14 of any given cell container 10.

Each cell container 10 defines at least one slot 30 in a top portion thereof. A preferred embodiment of the invention is illustrated in FIGS. 1 and 2. As illustrated in the figures, one or more of the upstanding sidewalls 12 of the container may include an outwardly extending flange 18 which is disposed on the upper edge of the sidewall. The flange 18 may extend generally laterally from the body of the container 10. Preferably, the flange 18 defines two slots 30 therein, the slots being oriented side by side and spaced a predetermined distance to define a tab 20 therebetween. Each slot 30 preferably extends inward from a free end 22 of the flange 18 to the flange edge 32 and slightly into the side wall 12 of the cell container 10, though in some constructions the slots 30 may only extend substantially up to the flange edge 32. In instances where the cell container 10 does not include a flange 18, two slots 30 may extend in the upper portion of the side wall 12 so as to define tab 20 therebetween.

The slots 30 are preferably provided by burning, stamping, slicing, cutting, scoring or perforating into the plastic or the material at an upper portion, namely, the flange 18 and/or side wall 12 of the cell container 10. However, any suitable device or method may be used to produce the slots 30 in the cell container 10, such as, the slots 30 may be provided as being part of the thermal forming process itself or any known process in forming the tray 1. Further, each slot 30 in a tray 1 or cell container may be burned, stamped, sliced, cut, scored or perforated at the upper portion thereof all within one stroke, or, the slots may be provided singularly, or per column/row of the tray 1, or per cell container 10.

In the most preferred construction, the slots are formed by bringing the container into close proximity or contact with a hot element thereby melting or burning the slot through the material forming the sidewall 12 or the flange 18. In forming the slots in this manner, a thin border of melted material is formed about the perimeter of the slot 30, wherein the border is slightly thicker than the thickness of the material adjacent the border. Importantly, this border is of sufficient strength to resist a shearing or tearing of the material from the slot inwardly into the sidewall or the flange resulting from the application of small forces, e.g., ordinary handling, to the container. However, when the user applies a larger force to the tab 20, the border may be torn or ruptured and the slot may be extended into the body of the sidewall 12 or the flange 18.

Figure 2A:
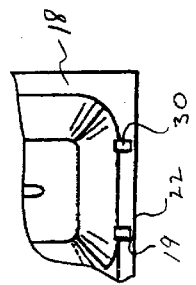
Figure 3:
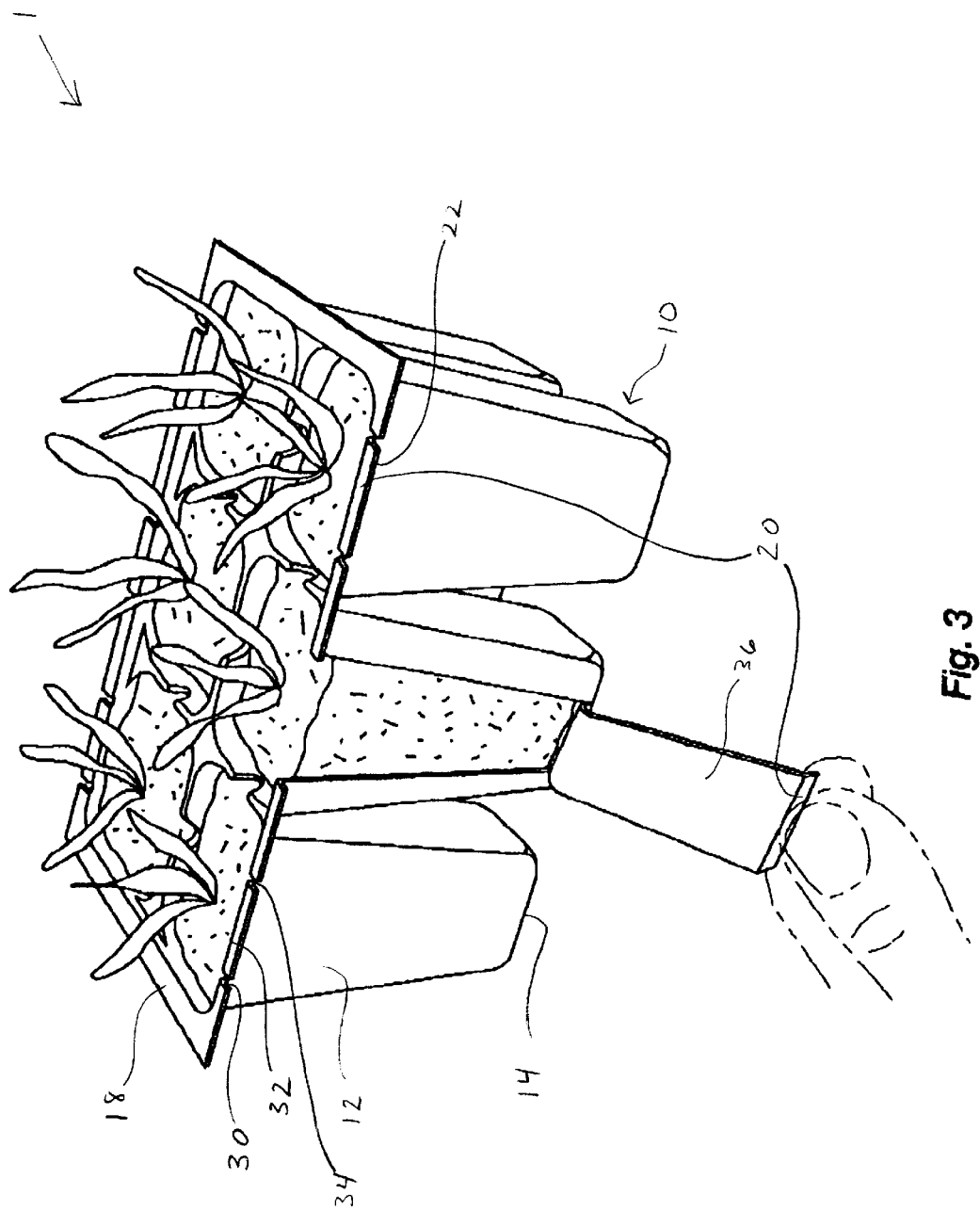
FIG. 3 is a perspective view of a plant container tray, illustrating slots providing strip-away sides.
Figure 4:
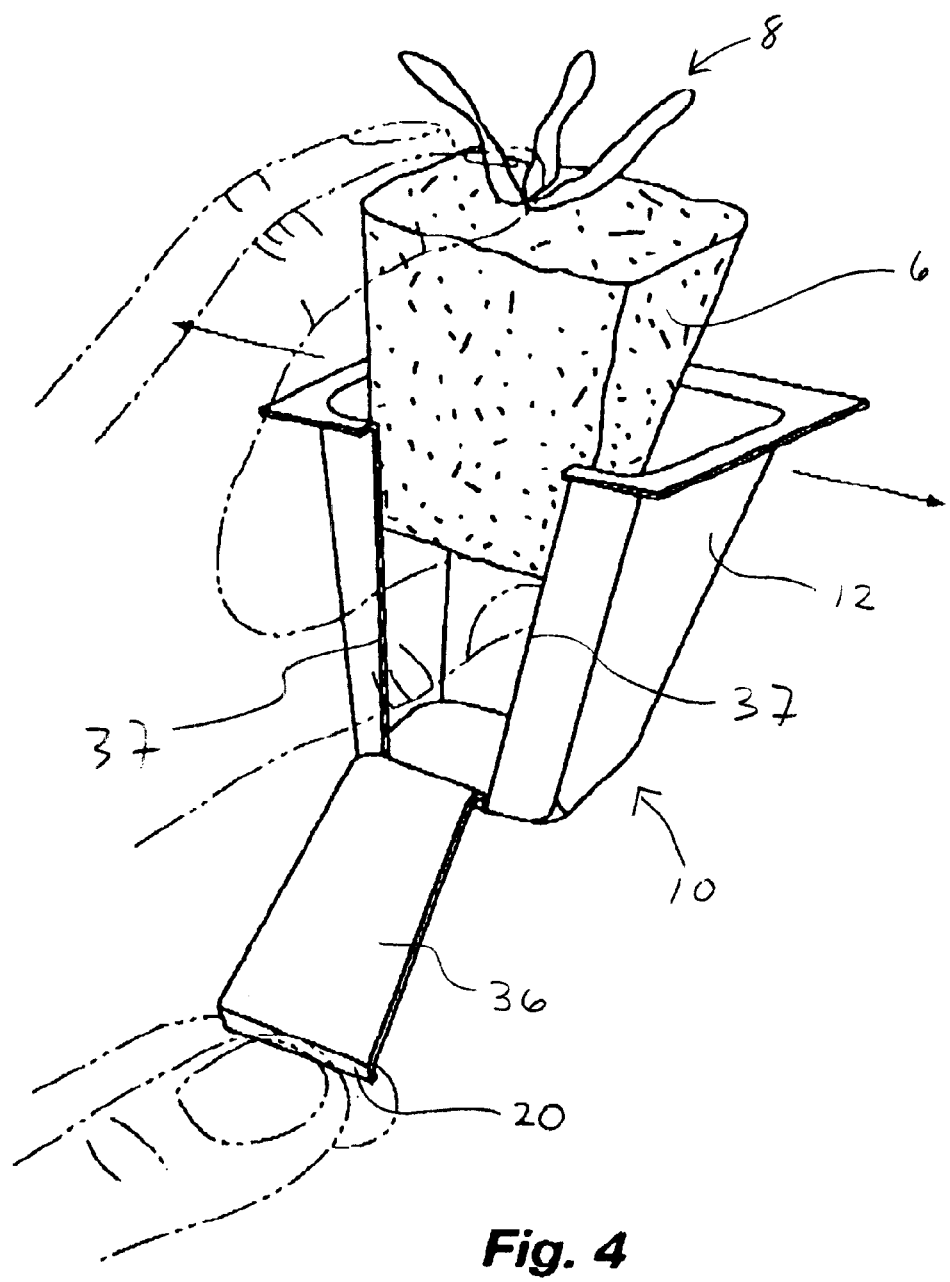
FIG. 4 is a perspective view of a single cell container, illustrating a method of removing a seedling from the cell container.

According to the present invention, a slot 30 is defined as an opening, slit, notch, groove, depression, score, and/or perforation. Each slot 30 may extend into the flange 18 from a free end 22 thereof. The slot 30 may have a first open end 33 which communicates with the edge of the flange 18. Alternatively, the slot 30 may be separated from the free end 22 of the flange by a thin portion 19 of the flange 18 (see, FIG. 2(a)), which thin portion may be easily torn by the application of a user generated force to the thin portion. Each slot 30 also includes a slot end 34, which may be at the flange 18, flange edge 32, or the side wall 12 depending on the depth of the slot into the cell container and the configuration of the cell container itself. The slot end 34 provides a stress riser proximate the slot end 34 when a force is applied downward on tab 20. As shown in drawing FIG. 3, applying force to tab 20, such as manually pulling tab 20 downward, creates the stress riser proximate the slot end 34. When sufficient force is applied, the stress riser causes the side wall 12 to weaken and eventually rupture. As the sidewall is torn along tear lines 37, a portion 36 of the sidewall is removed from the remaining sidewall 12 thereby exposing the growth medium 6 surrounding the plant 8 and its root structure. As shown in FIG. 4, removal of the growth medium 6 and root structure from the cell container 10 may then be completed by manually lifting the growth medium 6 with the plant 8 from the container. If the growth medium 6 is root bound to the side walls 12 of the container, the side walls 12 may be manually pulled in opposite directions (shown by arrows in FIG. 4) prior to lifting the growth medium 6 from the cell container 10.

Therefore, it is well appreciated that the slots 30 defining tab 20 in the flange 18 and/or the side wall 12 provide the strip-away side wall 36 by manually pulling downward on the tab 20. In this manner, the present invention provides simple and easy removal of the growth medium 6 and root structure of the plant 8 from the cell container 10 without substantially damaging the structural integrity of the growth medium 6 surrounding the root structure. The plants can therefore be transplanted more quickly, efficiently and with less potential damage to the root structure, providing for healthier seedlings and an increased chance of survival after being transplanted. The need for the user to compress the container 10 to ease the removal of the plant from the container should be dramatically reduced, thereby lessening the possibility of damage to the root structure of the plant. Further, additional devices are not needed to extract the plant as used conventionally. Therefore, transplanting the plants according to the present invention is more controlled and much easier for the person undergoing the task.

Figure 5:
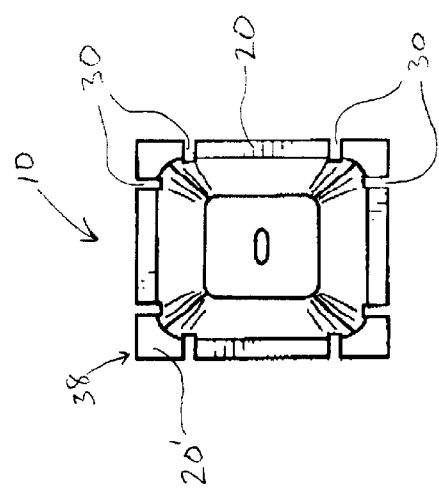
FIG. 5 is a top view of a single cell container, illustrating an alternate configuration of sidewall defined slots.

Referring to drawing FIG. 5, an alternate embodiment of the present invention is shown in a top view of the cell container 10. In this alternate embodiment, the cell container 10 may include additional slots 30 at an upper portion therein to define the tab 20 at multiple locations. In addition, by including additional slots 30 in the cell container 10 so that the slots are adjacent and common to a corner portion 38, the slots define a corner tab 20'. Accordingly, the cell container 10 in this alternate embodiment may allow one to utilize tab 20 at multiple locations of the cell container, and/or, to utilize corner tab 20', in which each tab 20 and corner tab 20' provides the strip-away side wall 36 as previously set forth by manually pulling downward on the tab 20 and/or corner tab 20'.

Figure 6:
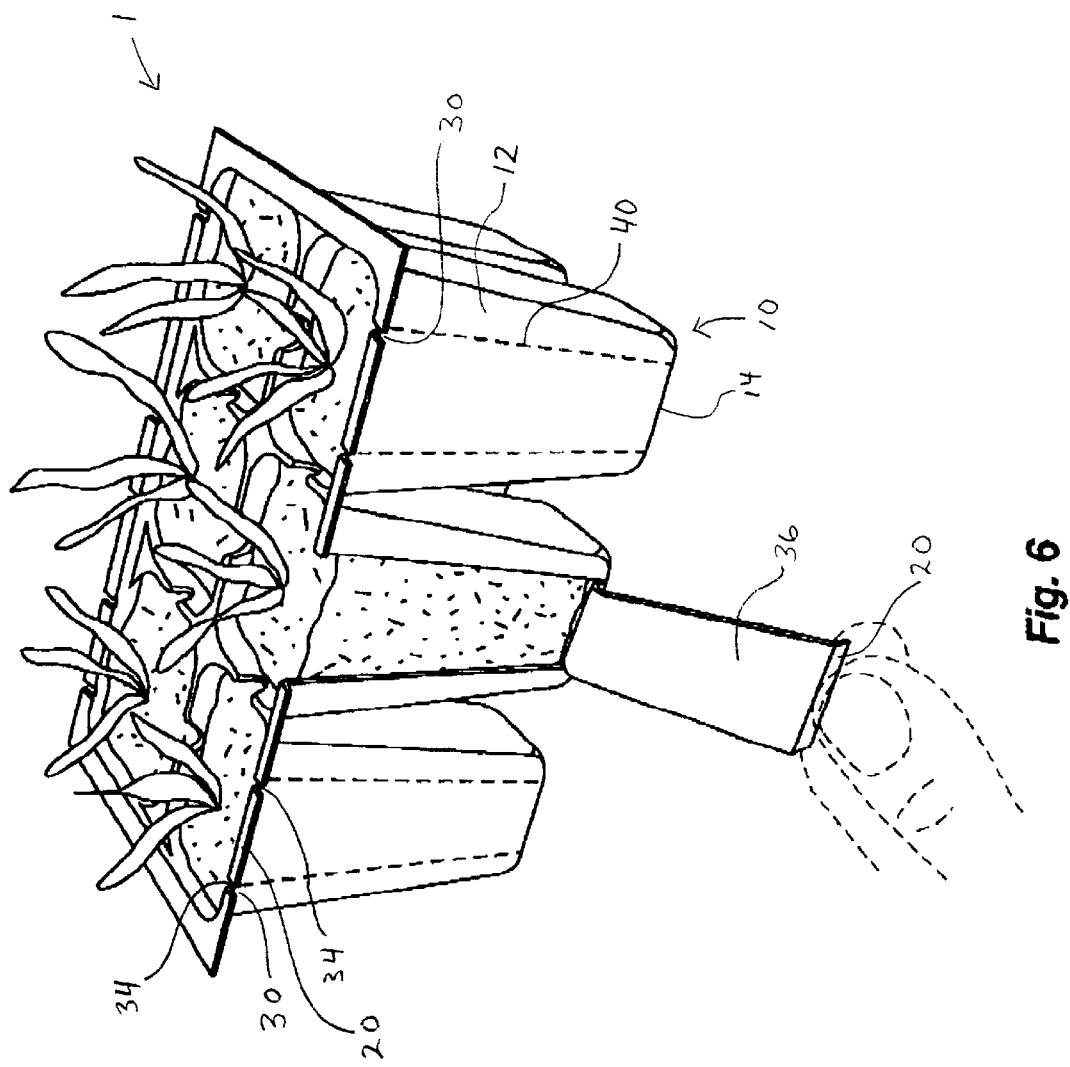
FIG. 6 is a perspective view of a second embodiment of a cell container, illustrating slots and perforations providing strip-away sides.

Referring to drawing FIG. 6, a second embodiment of a cell container 10 is shown. The cell container 10 of the second embodiment is similar to that of the first embodiment, however, in addition to the slots 30 the side wall 12 includes a scored or perforated side wall 40. The perforated side wall 40 is utilized for cell containers 10 made of thick walled plastic. The perforated side wall 40 preferably extends downward proximately from the slot end 34 of each slot 30 to the bottom wall 14, and may even extend into the bottom wall 14. As such, the perforated side wall 40 defines the strip-away side wall 36 of the thick walled plastic when tab 20 is manually pulled as previously set forth in the first embodiment. Alternatively, the side walls 12 of the second embodiment may be formed in the molding process to include a thinned portion to preferably extend downward proximately from the slot end 34 of each slot 30 to the bottom wall 14. In this manner, the thinned portion in the side wall 12 defines the strip-away side wall 36 just as the perforated side wall 40 previously set forth. The thinned portion may be formed during a thermal forming process or any process known to one of ordinary skill in the art.

Figure 7:
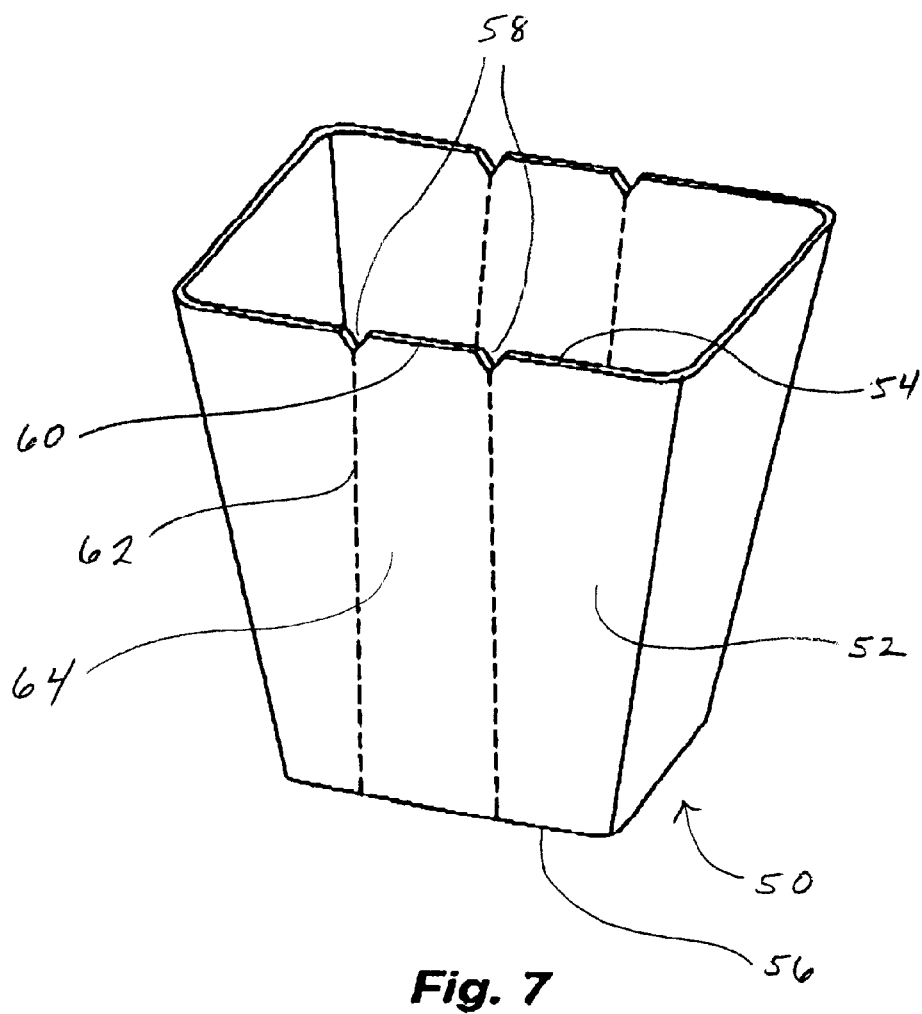
FIG. 7 is a perspective view of a third embodiment of a large cell container, illustrating break-away sides.

Referring to drawing FIG. 7, a third embodiment of the cell container 10 is shown. The cell container 10 of the third embodiment is a large container 50 having side walls 52 with an upper portion 54 and a bottom wall 56. The large container 50 may be made of a thicker more durable plastic as known in the art or a biodegradable material as known in the art for transplanting larger plants. In the third embodiment, the upper portion 54 of the side wall 52 includes at least two cuts 58 therein. The cuts 58 may be defined as an opening, slit, notch, groove, depression, score, and/or perforation. The cuts 58 in the upper portion 54 define a tab 60 therebetween. The upper portion 54 where the cuts 58 are located may include a flange or lip. As in the previous embodiment, the side wall 52 of the large container 50 includes a scored or perforated side wall 62 that extends downward proximately from the cuts 58 to approximately the bottom wall 56. Thus, when the tab 60 between the cuts 58 is manually forced in a substantially downward direction, stress risers proximate the cuts 58 allow the perforated side wall 60 to strip-away from the large container 50. As such, the portion striped away from the large container is a strip-away side wall 64, which thereby, exposes the growth medium surrounding the root structure of the plant therein to allow simple and easy removal thereof. As in the previous embodiments, the present invention provides for easy removal of the growth medium and root structure from the large container 50 by manually lifting the growth medium with the plant therein. Thus, plants can therefore be transplanted with less potential damage to the root structure thereof, providing for healthier plants and an increased chance of survival thereafter.

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

What is claimed is:

1. A plant container comprising:
   an upstanding side wall having an upper edge and a first thickness, said upstanding side wall defining two elongate first openings positioned spacedly apart from one another, each said first opening extending entirely through said first thickness and downwardly from said upper edge through a portion of said side wall;
   a flange, secured to said upper edge of said upstanding side wall to extend laterally outward from said side wall, said flange having a second thickness and a width which extends from a free edge of said flange to a securement of said flange to said upper edge, said flange defining two elongate second openings positioned spacedly apart from one another, each of said second openings extending from a respective first end which is spacedly removed from said free edge of said flange to a respective second end positioned proximate said upper edge of said upstanding side wall, said flange having a portion thereof disposed intermediate said first end of each said second opening and said free edge of said flange, each said second opening extending entirely through said second thickness of said flange;
   wherein each said first elongate opening communicates with a respective said second elongate opening to form a continuous opening which extends from said first end of said second elongate openings, through a portion of said width of said flange and downwardly through said portion of said upstanding sidewall.

2. The plant container of claim 1, wherein said upstanding side wall is generally planar in configuration and said first openings are defined within a common plane of said side wall.

3. The plant container of claim 1, wherein said flange is generally planar in configuration and said second openings are defined within a common plane of said flange.

4. The plant container of claim 1, wherein said two elongate second openings are spacedly apart and substantially parallel to one another.

5. The plant container of claim 1, wherein said two elongate second openings in said flange are spacedly apart to define a tab between said second openings.

6. The plant container of claim 1, wherein said flange extending laterally outward from said sidewall includes a corner portion and wherein said two elongate second openings extend in substantially normal directions to one another on both sides of said corner portion and proximate thereto.

7. The plant container of claim 6, wherein said corner portion with said two elongate second openings on said both sides of said corner portion defines a tab.

8. The plant container of claim 1, wherein said upstanding side wall further comprises at least one of a perforated portion, a scored portion and a thinned portion.

9. The plant container of claim 8, wherein said at least one of said perforated portion, said scored portion and said thinned portion of said upstanding side wall extends substantially from an end portion of each of said two elongate first openings.

10. The plant container of claim 9, wherein said at least one of said perforated portion, said scored portion and said thinned portion of said upstanding side wall defines a break-away portion in said upstanding side wall.

11. The plant container of claim 10, wherein said break-away portion strips away from said upstanding side wall when a substantially downward force is applied to a flange portion between said two elongate second openings.

12. A plant container comprising:
    an upstanding side wall having an upper edge and a first thickness, said upstanding side wall defining two elongate first openings positioned spacedly apart from one another, each said first opening extending entirely through said first thickness and downwardly from said upper edge through a portion of said sidewall;
    a flange, secured to said upper edge of said upstanding side wall to extend laterally outward from said sidewall, said flange having a second thickness and a width, which extends from a free edge of said flange to a securement of said flange to said upper edge, said flange defining two elongate second openings positioned spacedly apart from one another, each of said second openings extending from said free edge of said flange to said upper edge of said upstanding side wall, each said second opening extending entirely through said second thickness of said flange;
    wherein each said first elongate opening communicates with a respective said second elongate opening to form a continuous opening which extends from said free edge of said flange, through said entire width of said flange and downwardly through said portion of said upstanding sidewall.

13. The plant container of claim 12, wherein said upstanding side wall is generally planar in configuration and said first openings are defined within a common plane of said side wall.

14. The plant container of claim 12, wherein said flange is generally planar in configuration and said second openings are defined within a common plane of said flange.

15. The plant container of claim 12, wherein said two elongate second openings are spacedly apart and substantially parallel to one another.

16. The plant container of claim 12, wherein said two elongate second openings in said flange are spacedly apart to define a tab between said second openings.

17. The plant container of claim 12, wherein said flange extending laterally outward from said sidewall includes a corner portion and wherein said two elongate second openings extend in substantially normal directions to one another on both sides of said corner portion and proximate thereto.

18. The plant container of claim 17, wherein said corner portion with said two elongate second openings on said both sides of said corner portion defines a tab.

19. The plant container of claim 12, wherein said upstanding side wall further comprises at least one of a perforated portion, a scored portion and a thinned portion.

20. The plant container of claim 19, wherein said at least one of said perforated portion, said scored portion and said thinned portion of said upstanding side wall extends substantially from an end portion of each of said two elongate first openings.

21. The plant container of claim 20, wherein said at least one of said perforated portion, said scored portion and said thinned portion of said upstanding side wall defines a break-away portion in said upstanding side wall.

22. The plant container of claim 21, wherein said break-away portion strips away from said upstanding side wall when a substantially downward force is applied to a flange portion between said two elongate second openings.

23. A method of making a plant container, the method comprising:

providing an upstanding side wall having an upper edge and a first thickness and providing a flange secured to said upper edge of said upstanding side wall, said flange having a second thickness and a width extending from a free edge of said flange to a securement of said flange to said upper edge; and forming two continuous openings in said upstanding side wall and said flange defined by two elongate first openings in said upstanding side wall positioned spacedly apart from one another and extending entirely through said first thickness and downwardly from said upper edge through a portion of said side wall and defined by two elongate second openings positioned spacedly apart from one another and extending entirely through said second thickness and from a respective first end which is spacedly removed from said free edge of said flange to a respective second end positioned proximate said upper edge of said upstanding side wall, said flange having a portion thereof disposed intermediate said first end of each said second opening and said free edge of said flange, wherein each of said first elongate openings communicate with a respective one of said second elongate openings to form said two continuous openings which extends from said first end of said second elongate openings, through a portion of said width of said flange and downwardly through said portion of said upstanding sidewall.

24. The method according to claim 23, wherein said forming comprises forming said two continuous openings in said flange and said upstanding side wall by at least one of burning, slicing, and molding.

25. The method according to claim 23, wherein said forming comprises configuring said two continuous openings substantially parallel to one another to define a tab therebetween.

26. The method according to claim 23, further comprising forming at least one of a perforated side wall, a scored side wall, and a thinned side wall in said upstanding side wall so that a portion of said at least one of said perforated side wall, said scored side wall, and said thinned side wall extends from an end portion of each of said two continuous openings in said upstanding side wall.

27. A method of making a plant container, the method comprising:

providing an upstanding side wall having an upper edge and a first thickness and providing a flange secured to said upper edge of said upstanding side wall, said flange having a second thickness and a width extending from a free edge of said flange to a securement of said flange to said upper edge; and forming two continuous openings in said upstanding side wall and said flange defined by two elongate first openings in said upstanding side wall positioned spacedly apart from one another and extending entirely through said first thickness and downwardly from said upper edge through a portion of said side wall and defined by two elongate second openings positioned spacedly apart from one another and extending entirely through said second thickness and from said free edge of said flange to said upper edge of said upstanding side wall, wherein said first elongate openings communicate with a respective one of said second elongate openings to form said two continuous openings which extend from said free edge of said flange, through said entire width of said flange and downwardly through said portion of said upstanding sidewall.

28. The method according to claim 27, wherein said forming comprises forming said two continuous openings in said flange and said upstanding side wall by at least one of burning, slicing, and molding.

29. The method according to claim 27, wherein said forming comprises configuring said two continuous openings substantially parallel to one another to define a tab therebetween.

30. The method according to claim 27, further comprising forming at least one of a perforated side wall, a scored side wall, and a thinned side wall in said upstanding side wall so that a portion of said at least one of said perforated side wall, said scored side wall, and said thinned side wall extends from an end portion of each of said two continuous openings in said upstanding side wall.

* * * * *